United States Patent
Cazier et al.

(10) Patent No.: US 7,724,287 B2
(45) Date of Patent: May 25, 2010

(54) SKETCH EFFECT FOR DIGITAL PHOTOGRAPHS

(75) Inventors: Robert P. Cazier, Fort Collins, CO (US); Casey L. Miller, Fort Collins, CO (US); Andrew C. Goris, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 710 days.

(21) Appl. No.: 11/496,219

(22) Filed: Jul. 31, 2006

(65) Prior Publication Data

US 2008/0024617 A1 Jan. 31, 2008

(51) Int. Cl.
*H04N 5/228* (2006.01)

(52) U.S. Cl. .................... 348/222.1; 382/205

(58) Field of Classification Search .............. 348/239, 348/241, 254, 276, 222.1; 382/254, 276, 382/258–269, 205, 203, 204, 209, 210; 345/470, 345/473
See application file for complete search history.

(56) References Cited

U.S. PATENT DOCUMENTS

| | | | |
|---|---|---|---|
| 4,731,865 A * | 3/1988 | Sievenpiper | 382/274 |
| 5,966,134 A | 10/1999 | Arias | |
| 5,978,523 A * | 11/1999 | Linford et al. | 382/305 |
| 6,014,469 A * | 1/2000 | Eschbach | 382/261 |
| 6,226,015 B1 | 5/2001 | Danneels et al. | |
| 6,894,694 B1 * | 5/2005 | Silverbrook et al. | 345/581 |
| 7,039,216 B2 * | 5/2006 | Shum et al. | 382/100 |
| 7,295,211 B2 * | 11/2007 | Silverbrook et al. | 345/581 |
| 7,333,672 B2 * | 2/2008 | Chatting et al. | 382/266 |
| 7,453,498 B2 * | 11/2008 | Prentice et al. | 348/222.1 |
| 2004/0042680 A1 * | 3/2004 | Saund | 382/274 |
| 2004/0258308 A1 * | 12/2004 | Sadovsky et al. | 382/190 |
| 2005/0025357 A1 * | 2/2005 | Landwehr et al. | 382/170 |
| 2005/0100243 A1 * | 5/2005 | Shum et al. | 382/276 |
| 2005/0180659 A1 * | 8/2005 | Zaklika et al. | 382/309 |
| 2006/0152530 A1 * | 7/2006 | Smith | 345/611 |
| 2006/0195786 A1 * | 8/2006 | Stoen et al. | 715/700 |
| 2007/0154110 A1 * | 7/2007 | Wen et al. | 382/276 |
| 2007/0291338 A1 * | 12/2007 | Williams et al. | 358/537 |

* cited by examiner

*Primary Examiner*—Tuan Ho
*Assistant Examiner*—Don Nguyen

(57) ABSTRACT

Systems and methods are disclosed for applying sketch effects to digital images. An exemplary method may comprise comparing an original image to a filtered image. The method may also comprise rendering changes in the filtered image as lines. The method may also comprise applying connected component labeling to lines in the filtered image to reduce noise. The method may also comprise rendering the filtered image with a sketch effect after reducing noise in the filtered image.

13 Claims, 6 Drawing Sheets

SKETCH EFFECT FOR DIGITAL PHOTOGRAPHS

BACKGROUND

Conventional film and more recently, digital cameras, are widely commercially available, ranging both in price and in operation from sophisticated single lens reflex (SLR) cameras used by professional photographers to inexpensive "point-and-shoot" cameras that nearly anyone can use with relative ease. Digital cameras are available with user interfaces that enable a user to select various camera features (e.g., ISO speed and red-eye removal). Some camera systems also allow the user to add creative effects (e.g., sepia tones, borders, etc.) to their photographs Little is commercially available for allowing the user to create images from their photographs that appear as line drawings or "sketches" of the scene being photographed. Although photo-editing algorithms have been developed to create so-called "cartoon" effects, these are fairly sophisticated, requiring extensive processing power, and therefore are only suitable for use on computer systems. Digital camera users would need to download their photos to a personal computer (PC) to use the software before they can add such creative effects to their digital images.

DETAILED DESCRIPTION

Systems and methods are disclosed for creating a sketch effect for digital photographs. Exemplary systems may be implemented as an easy-to-use user interface displayed on the digital camera and navigated by the user with conventional camera controls (e.g., arrow buttons and zoom levers already provided on the camera). The user needs little, if any, knowledge about photo-editing, and does not need special software for their PC to create a sketch effect for their digital images. Various user options for creating the sketch effect are also available so that the desired sketch effect can be selected directly on the camera itself and can then be transferred to the user's PC (e.g., for sharing via email), printer, and/or photo processing station (e.g., Internet or store-based) to generate prints.

Exemplary Systems

Figure 1:
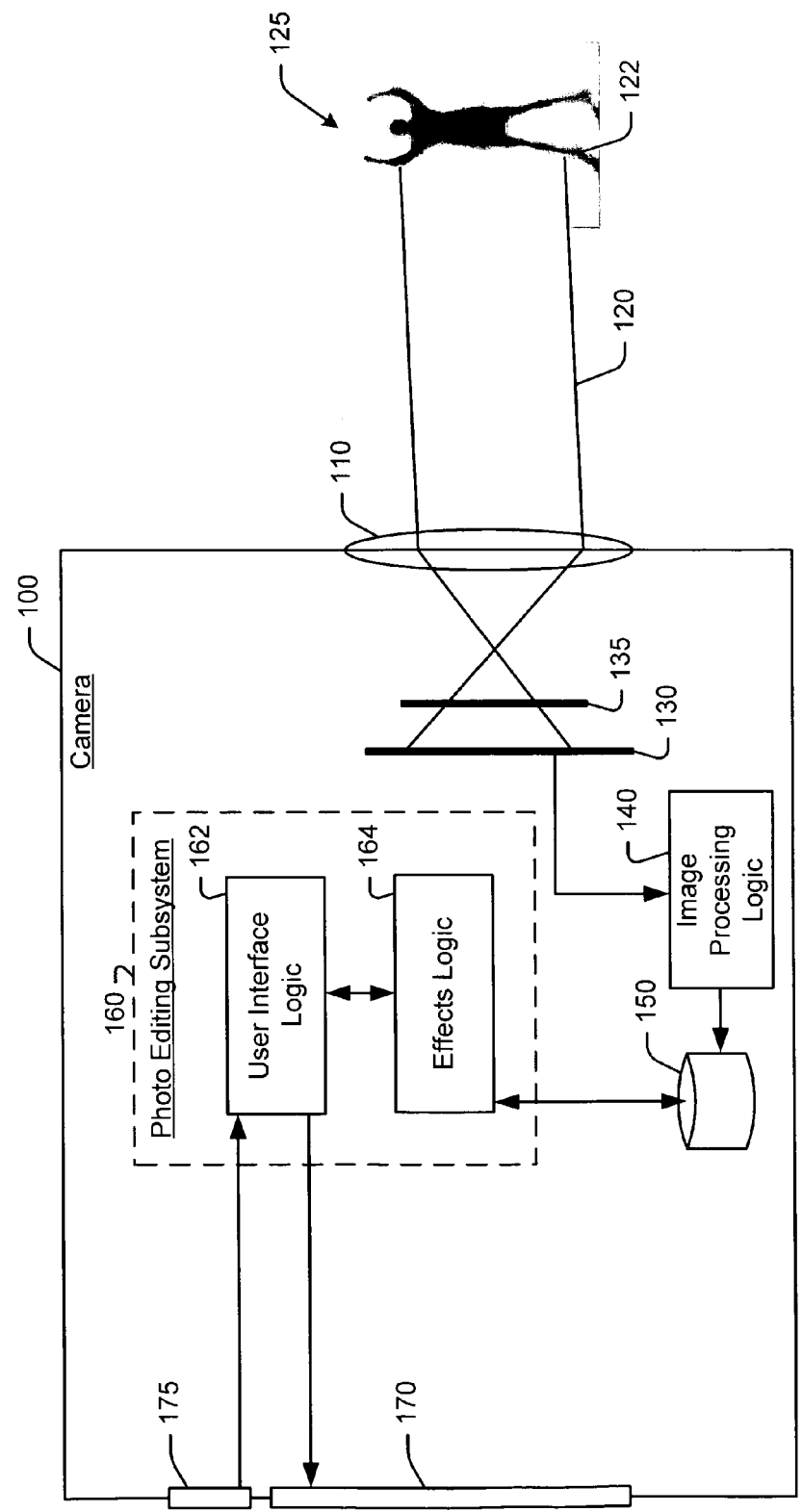
FIG. 1 is a block diagram of an exemplary camera system which may implement a sketch effect for digital photographs.

FIG. 1 is a block diagram of an exemplary camera system which may implement a sketch effect for digital photographs. The exemplary camera system may be a digital camera 100 including a lens 110 positioned to focus light 120 reflected from one or more objects 122 in a scene 125 onto an image capture device or image sensor 130 when a shutter 135 is open (e.g., for image exposure). Exemplary lens 110 may be any suitable lens which focuses light 120 reflected from the scene 125 onto image sensor 130.

Exemplary image sensor 130 may be implemented as a plurality of photosensitive cells, each of which builds-up or accumulates an electrical charge in response to exposure to light. The accumulated electrical charge for any given pixel is proportional to the intensity and duration of the light exposure. Exemplary image sensor 130 may include, but is not limited to, a charge-coupled device (CCD), or a complementary metal oxide semiconductor (CMOS) sensor.

Camera system 100 may also include image processing logic 140. In digital cameras, the image processing logic 140 receives electrical signals from the image sensor 130 representative of the light 120 captured by the image sensor 130 during exposure to generate a digital image of the scene 125. The digital image may be stored in the camera's memory 150 (e.g., a removable memory card).

Shutters, image sensors, memory, and image processing logic, such as those illustrated in FIG. 1, are well-understood in the camera and photography arts. These components may be readily provided for digital camera 100 by those having ordinary skill in the art after becoming familiar with the teachings herein, and therefore further description is not necessary.

Digital camera 100 may also include a photo-editing subsystem 160. In an exemplary embodiment, photo-editing subsystem 160 is implemented in program code (e.g., firmware and/or software) residing in memory on the digital camera 100 and executable by a processor in the digital camera 100, such as the memory and processor typically provided with commercially available digital cameras. The photo-editing subsystem 160 may include user interface logic 162 and effects logic 164.

The effects logic 164 may be operatively associated with the memory 150 for accessing digital images (e.g., reading the images stored in memory 150 by image processing logic 140 or writing the images generated by the effects logic 164). Effects logic 164 may include program code for applying a sketch effect to the digital images stored on the camera 100. The effects logic 164 may also be operatively associated with the user interface logic 162.

User interface logic 162 may be operatively associated with a display 170 and one or more camera controls 175 already provided on many commercially available digital cameras. Such an embodiment reduces manufacturing costs (e.g., by not having to provide additional hardware for implementing the photo-editing subsystem 160), and enhances usability by not overwhelming the user with additional camera buttons.

During operation, the user interface logic 162 displays an effects menu on the digital camera (e.g., on display 170). In an exemplary embodiment, the effects menu may be accessed by a user selecting the design gallery menu option. The effects menu may then be navigated by a user making selections from any of a variety menus options. For example, the user interface logic 162 may receive input (e.g., via one or more of the camera controls 175) identifying user selection(s) from the effects menu. The effects logic 164 may then be implemented to apply a sketch effect to a digital image stored in the digital camera 100 (e.g., in memory 150) based on user selection(s) from the effects menu.

A preview image may be displayed on display 170 so that the user can see the sketch effect. Optionally, instructive text may also be displayed on display 170 for modifying, or accepting/rejecting the sketch effect. The instructive text may be displayed until the user operates a camera control 175 (e.g., presses a button on the digital camera 100). After the user operates a camera control 175, the text may be removed so that the user can better see the preview image and sketch effect on display 170.

Also optionally, the user may operate camera controls 175 (e.g., as indicated by the instructive text) to modify the sketch effect. For example, the user may press the left/right arrow buttons on the digital camera 100 to change the degree of line filtering, as explained in more detail below.

In an exemplary embodiment, a copy of the original digital photograph is used for adding a sketch effect to an image stored on the digital camera 100. For example, the new image may be viewed by the user on display 170 directly after the original image so that the user can readily see both the original image and the modified image.

Before continuing, it is noted that the digital camera 100 shown and described above with reference to FIG. 1 is merely exemplary of a camera which may implement a sketch effect for digital photographs. The systems and methods described herein, however, are not intended to be limited only to use with the digital camera 100. Other embodiments of cameras and/or systems which may implement a sketch effect for digital photographs are also contemplated.

Figure 2:
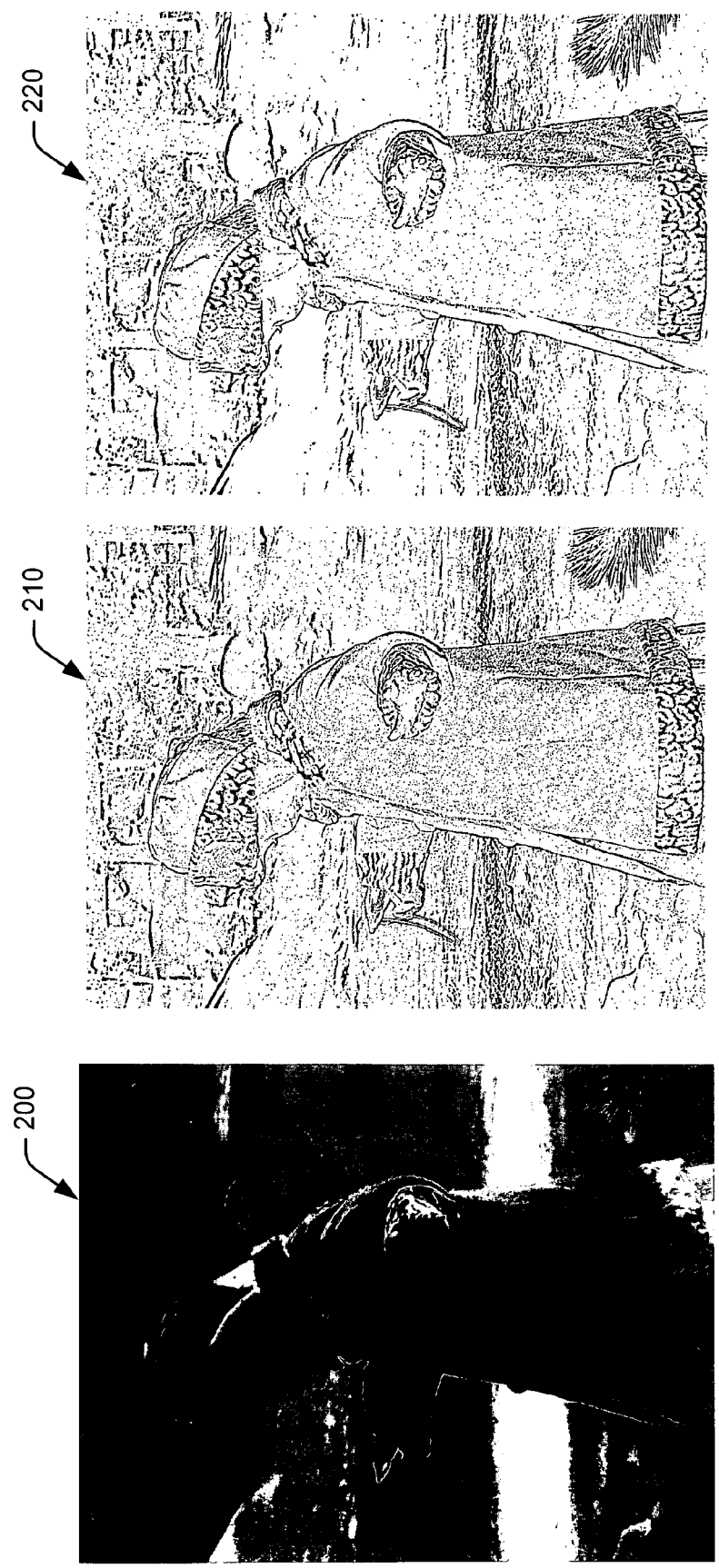
FIG. 2 shows an exemplary digital photograph, a filtered image corresponding to the digital photograph, and a sketch image corresponding to the filtered image.

FIG. 2 shows an exemplary digital photograph 200, a filtered image 210 corresponding to the digital photograph 200, and a sketch image 220 corresponding to the filtered image 210. The digital photograph 200 is first filtered, e.g., via a low pass filter into a secondary buffer to generate a gray-scale or black-and-white image of the digital photograph 200. This filtered image 210 is then compared to the original digital photograph 200 on a pixel-by-pixel (or group of pixel to group of pixel) basis. Changes are rendered as lines in the filtered image 210.

in an exemplary embodiment, each continuous line may be represented by a one byte per pixel rendering, e.g., to conserve memory resources in the camera system. This in effect turns the low pass filter into a high pass filter for the digital photograph 200.

It is observed in FIG. 2 that the filtered image 210 includes both acceptable outlines of objects from the digital photograph 200, in addition to unacceptable lines or "noise." Connected component labeling may then be applied to remove lines which do not satisfy a count threshold to reduce the number of lines (or noise) rendered in the sketch image 220. Exemplary embodiments of connected component labeling can be better understood with reference to the simplified illustration described below with reference to FIGS. 3 and 4.

Figure 3:
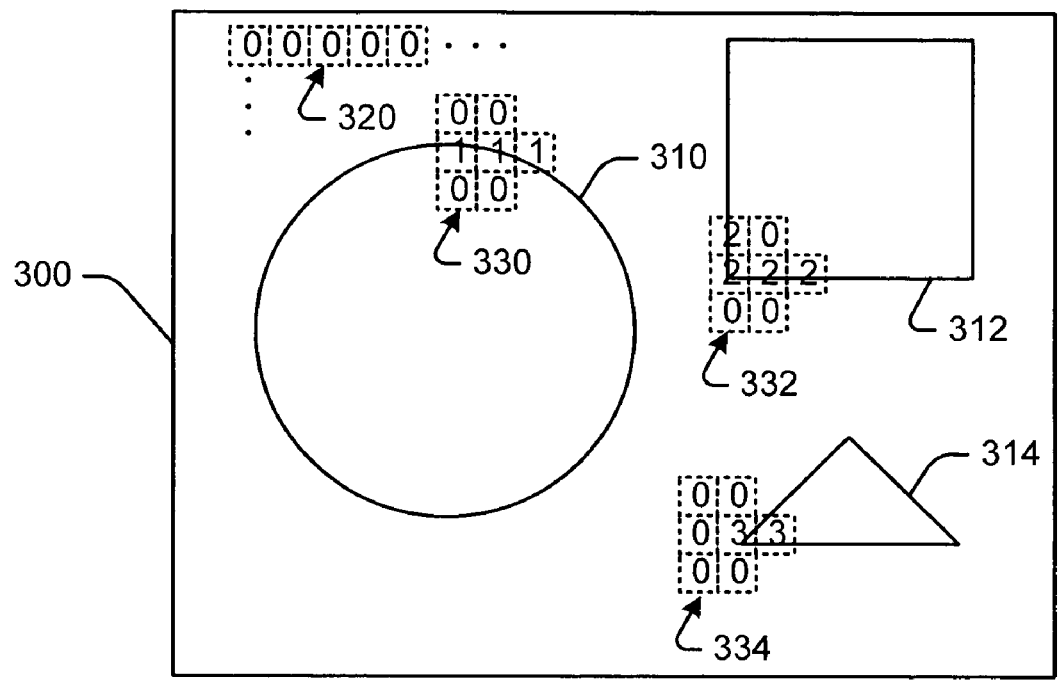
FIG. 3 is a simplified image illustrating an exemplary implementation for generating a sketch effect for a digital photograph.

FIG. 3 is a simplified image 300 illustrating an exemplary implementation for generating a sketch effect for a digital photograph. For purposes of this illustration, a digital photograph has already been filtered to generate a gray-scale or black-and-white image of the digital photograph, and the filtered image has already been compared to the original digital photograph. Changes are rendered as lines in the filtered image 300 shown in FIG. 3.

The filtered image 300 includes continuous lines representing a circle object 310, continuous lines representing a square object 312, and continuous lines representing a triangle object 314. It is noted, however, that the systems and methods described herein are not limited to use with simplified line data such as this (see, e.g., FIG. 2).

As discussed briefly above, connected component labeling may be applied to reduce the occurrence of noise. During connected component labeling, the image 300 is analyzed by scanning the pixels (illustrated by the pixels 320 in FIG. 3), or groups of pixels, for line data. The pixels may be scanned right to left and top to bottom on a first pass, then left to right and bottom to top on a second pass. Of course other embodiments for scanning the pixels are also contemplated.

In an exemplary embodiment, pixels containing no line data are assigned a "0" and each continuous line segment is assigned its own unique identifier. For purposes of illustration, each pixel containing line data for the circle object 310 is assigned a "1" (e.g., pixels 330), each pixel containing line data for the square object 312 is assigned a "2" (e.g., pixels 332), and each pixel containing line data for the triangle object 314 is assigned a "3" (e.g., pixels 334). A matrix may be generated based on the line data. An exemplary matrix is shown in Table 1.

TABLE 1

Exemplary Matrix

| Line ID | Pixel Count |
|---------|-------------|
| Line 1  | 1524        |
| Line 2  | 1362        |
| Line 3  | 984         |

The exemplary matrix shown in Table 1 includes a line ID for each continuous line in the image 300. In this example, there are three continuous lines, Line 1 representing the circle object 310, Line 2 representing the square object 312, and Line 3 representing the triangle object 314. The matrix also includes a pixel count for each line. For example, 1524 pixels in the image were assigned a "1", 1362 pixels in the image were assigned a "2", and 984 pixels in the image were assigned a "3". A sketch image may be rendered with only the lines satisfying a count threshold, as described in more detail now with reference to FIGS. 4*a-c*.

Figure 4:
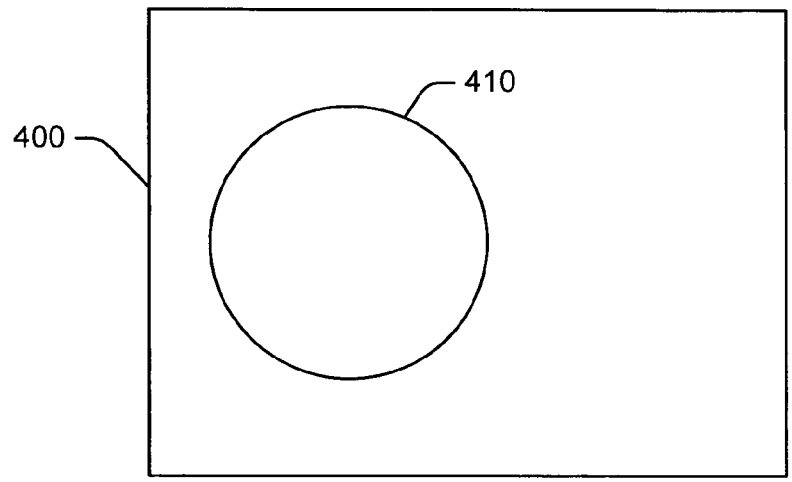
FIG. 4 shows various exemplary sketch effects corresponding to the simplified image shown in FIG. 3.
Figure 4:
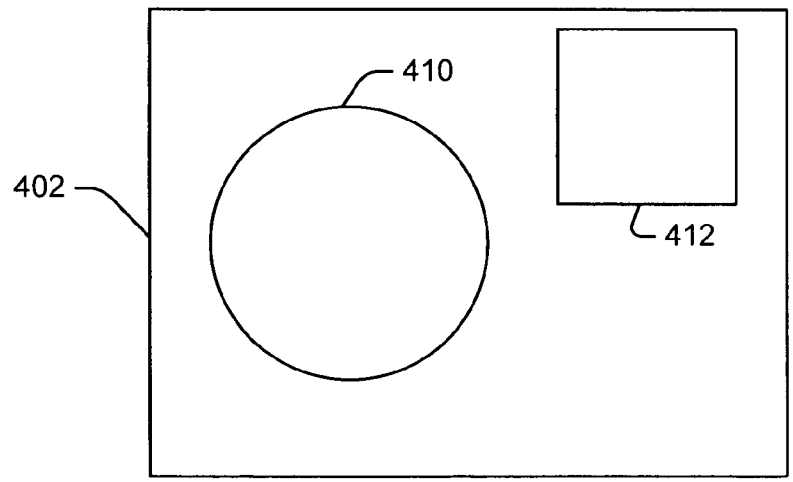
Figure 4:
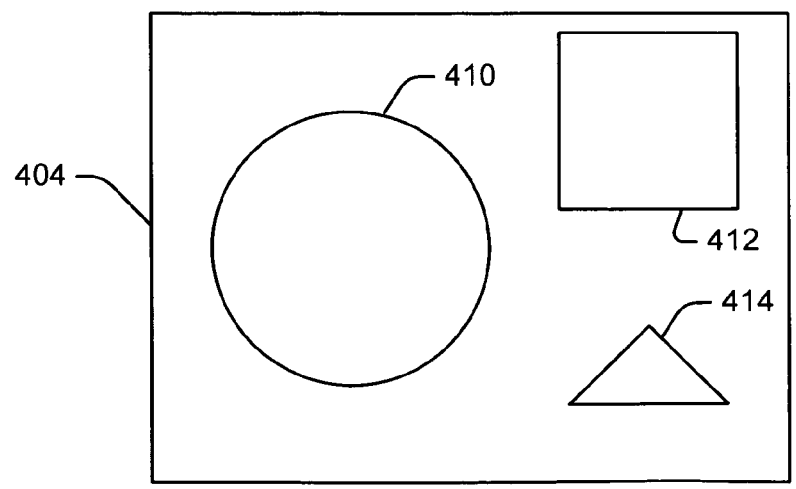

FIG. 4 shows various exemplary sketch effects corresponding to the image 300 shown in FIG. 3. In a first example, the count threshold may be 1500. Accordingly, only the lines satisfying a count threshold of 1500 or greater are rendered in the sketch image. As shown above in Table 1, only the circle object satisfies this count threshold, and accordingly, only the circle object 410 is rendered in the sketch image 400. In this example, the lines corresponding to the square object and the triangle object are considered noise, and therefore are not rendered in the sketch image 400.

In a second example, the count threshold may be 1000. Accordingly, only the lines satisfying a count threshold of 1000 or greater are rendered in the sketch image. As shown above in Table 1, both the circle object and the square object satisfy this count threshold, and accordingly, only the circle object 410 and square object 412 are rendered in the sketch image 402. In this example, the lines corresponding to the triangle object are considered noise, and therefore are not rendered in the sketch image 402.

In a third example, the count threshold may be 500. Accordingly, only the lines satisfying a count threshold of 500 or greater are rendered in the sketch image. As shown above in Table 1, the circle object, the square object, and the triangle object all satisfy this count threshold, and accordingly, the circle object 410, square object 412, and triangle object 414 are all rendered in the sketch image 404. None of the objects were considered noise. However, other lines (not shown) having a count threshold less than 500 would still be considered noise and would not be rendered in the sketch image 404.

In an exemplary embodiment, a scalable threshold may be implemented. Accordingly, the user may select different sketch effects (e.g., having more lines or less lines). Although the user's selection may depend at least to some extent on the user's preferences, typically the user will want to select the image that removes "noisy" lines while leaving enough lines to sufficiently convey a "sketch" of the image.

It is noted that implementing connected component labeling to track lines (and optionally line size), reduces processing requirements and time to produce the sketch effect. Accordingly, the sketch effect can be readily implemented on an embedded system, such as the camera system 100 described above with reference to FIG. 1. In addition, tracking lines and/or line size also enables the sketch effect to be applied to any image, independent of image size (e.g., a 3 mega-pixel image, a 10 mega-pixel image, a thumbnail image, etc.).

It is also noted that the implementation of connected component labeling shown and described with reference to FIGS. 3 and 4 is optimized for line rendering. In other embodiments, however, the filtered data may also be inverted such that lines are ignored and regions are retained (e.g., to produce an inverted sketch effect).

Exemplary Operations

Figure 5:
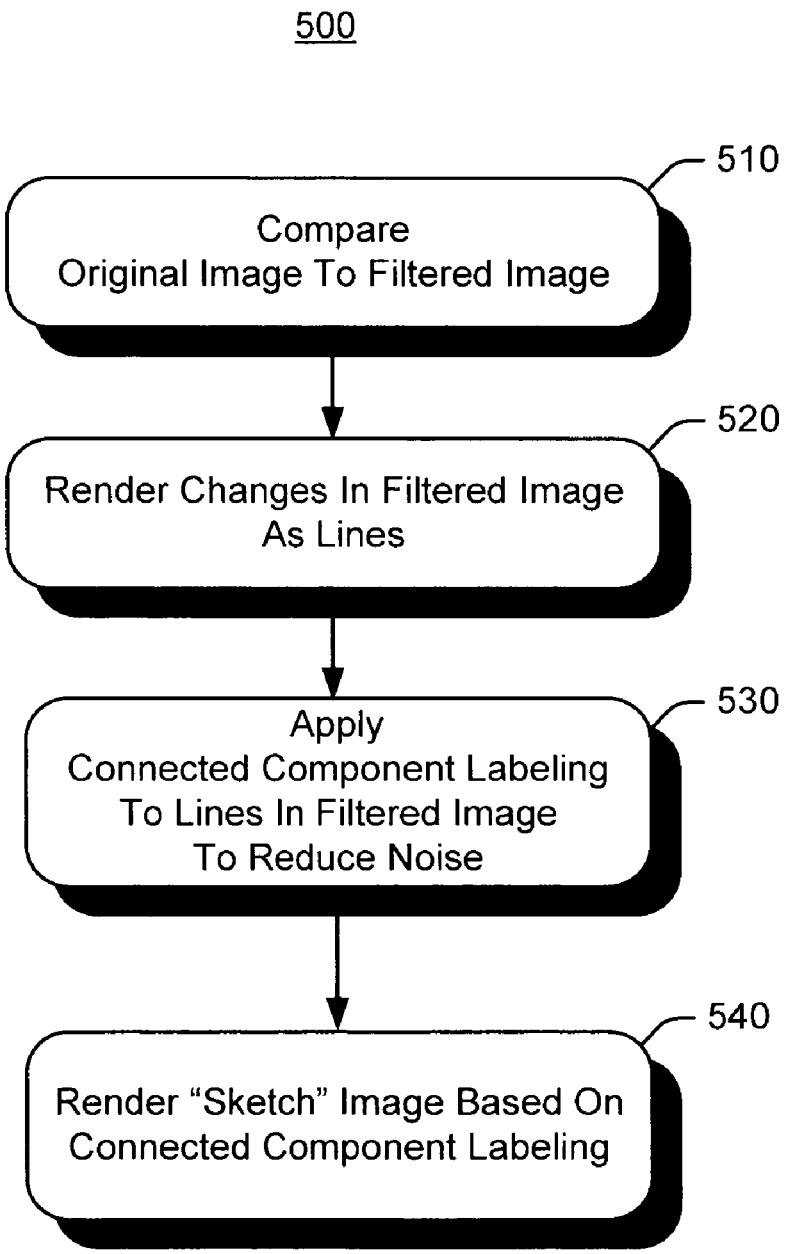
FIG. 5 is a flowchart illustrating exemplary operations to implement a sketch effect for digital photographs.
Figure 6:
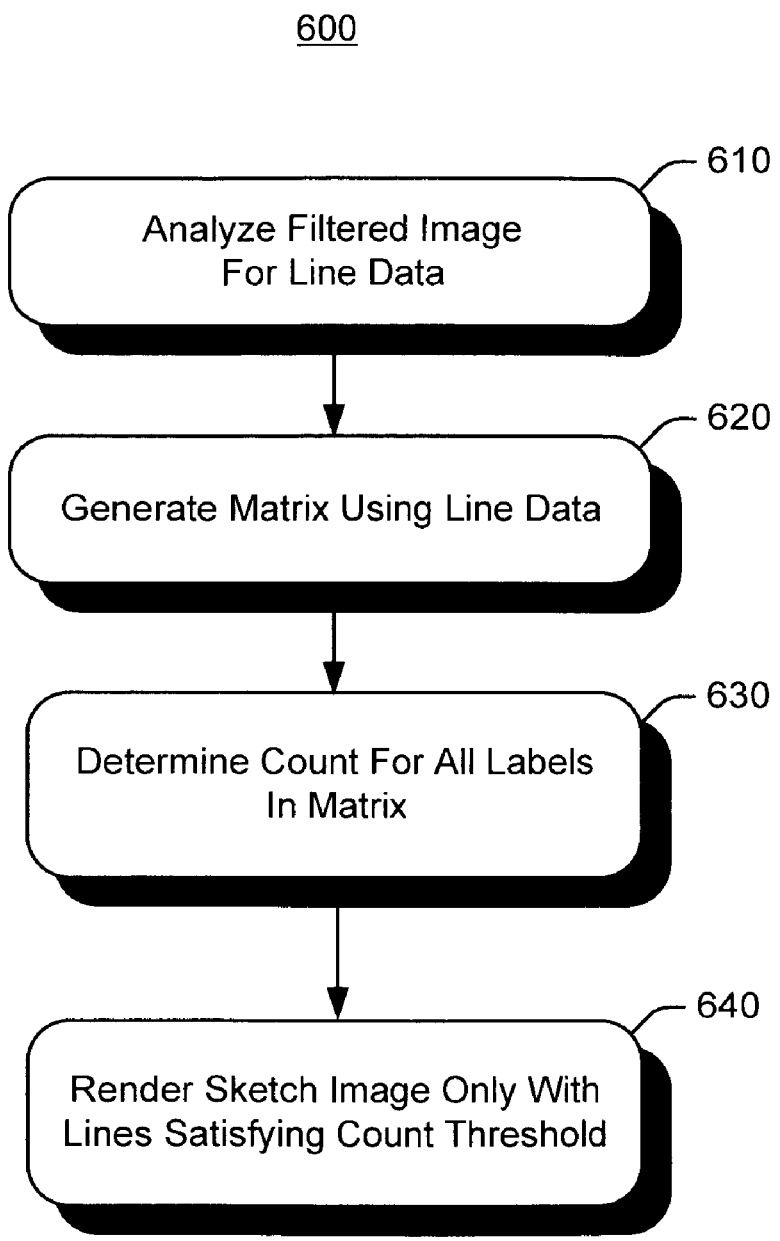
FIG. 6 is a flowchart illustrating exemplary connected component labeling operations to implement a sketch effect for digital photographs.

FIGS. 5 and 6 are flowcharts illustrating exemplary operations which may be used to implement a sketch effect for digital photographs. The operations may be embodied as logic instructions on one or more computer-readable medium. When executed on a processor (e.g., in the camera), the logic instructions implement the described operations. In an exemplary embodiment, the components and connections depicted in the figures may be implemented.

FIG. 5 is a flowchart illustrating exemplary operations 500 to implement a sketch effect for digital photographs. In operation 510, an original image is compared to a filtered image. For example, a digital photograph may be passed through a low pass filter into a secondary buffer to generate a gray-scale or black-and-white image, which can be compared to the original digital photograph on a pixel-by-pixel (or group of pixel to group of pixel) basis.

In operation 520, changes in the filtered image are rendered as lines. In an exemplary embodiment, each line may be represented by a one byte per pixel rendering, e.g., to conserve memory resources on the camera system. This in effect turns the low pass filter into a high pass filter, and the filtered image includes acceptable outlines and unacceptable lines or "noise."

In operation 530, connected component labeling is applied to all of the lines (both acceptable lines and lines considered to be noise). The connected component labeling reduces the occurrence of noise, as explained in one exemplary embodiment below with reference to the exemplary operations 600 shown in FIG. 6. In operation 540, a sketch image is rendered based on the connected component labeling in operation 530.

Other operations, not shown, are also contemplated and will be readily apparent to those having ordinary skill in the art after becoming familiar with the teachings herein. For example, the effects logic (or other logic) may store a separate copy of the digital image before applying the sketch effect to the selected digital image. Accordingly, the user can revert back to the original digital image if the user decides that they do not like the sketch effect they have chosen without having to undo all of the changes. In another example, the connected component labeling operation 530 may be applied to remove various degrees of noise, wherein the user may select which level of noise reduction results in the best sketch image.

FIG. 6 is a flowchart illustrating exemplary connected component labeling operations 600 to implement a sketch effect for digital photographs, e.g., operation 530 in FIG. 5. In operation 610, the filtered image is analyzed for line data. For example, pixel data may be scanned right to left and top to bottom on a first pass, then left to right and bottom to top on a second pass. In operation 620, a matrix is generated using the line data. In operation 630, a count for all line IDs or labels in the matrix is determined.

In operation 640, a sketch image may be rendered with only the lines satisfying a count threshold. In an exemplary embodiment, a scalable threshold may be implemented. Accordingly, the user may select from different sketch effects (e.g., between those having more or less lines).

It is noted that the exemplary embodiments shown and described are provided for purposes of illustration and are not intended to be limiting. Still other embodiments for implementing a sketch effect for digital photographs are also contemplated.

The invention claimed is:

1. A digital camera system comprising:
computer-readable storage for storing at least one digital image in the digital camera;
effects logic executing in the digital camera to generate a sketch effect for the at least one digital image, the effects logic:
generating a filtered image from the at least one digital image;
applying connected component labeling to the filtered image by:
analyzing the filtered image for line data;
generating a matrix using the line data;
determining a count for each continuous line in the matrix; and
rendering the sketch image only with continuous lines satisfying a count threshold; and
rendering the at least one digital image with a sketch effect.

2. The digital camera system of claim 1, further comprising a display device for displaying the at least one digital image with different sketch effects.

3. The digital camera system of claim 1, further comprising at least one camera control for receiving user input for generating the at least one digital image with the sketch effect.

4. The digital camera system of claim 1, further comprising at least one camera control for receiving user input for selecting the sketch effect for the at least one digital image.

5. A method for applying sketch effects to digital images, comprising:
comparing an original image to a filtered image;
rendering changes in the filtered image as lines;
applying connected component labeling to lines in the filtered image to reduce noise by:
determining a count for each continuous line appealing in the filtered version of the digital photograph;
applying a count threshold to remove noise from the filtered version of the digital photograph;
adjusting the count threshold to remove different levels of noise without reanalyzing the filtered version of the digital photograph; and
rendering the filtered image with a sketch effect after reducing noise in the filtered image.

6. The method of claim 5, further comprising making a copy of the digital image stored in the camera to preserve the digital image as an original.

7. The method of claim 5, further comprising displaying a preview image after rendering the filtered image with a sketch effect for the user to accept or reject before saving as a digital image.

8. The method of claim 5, further comprising analyzing the filtered version of the digital photograph for line data.

9. The method of claim 5, further comprising generating a matrix using line data for the filtered version of the digital photograph.

10. A computer program product encoding a computer process for producing a sketch effect for a digital photograph, the computer process comprising program code stored on computer readable media and executable for:
   comparing the digital photograph to a filtered version of the digital photograph;
   rendering changes in the filtered version of the digital photograph as lines based on at least one user-selectable count threshold, the count threshold selected to remove noise from the filtered version of the digital photograph;
   applying connected component labeling to the lines in the filtered version of the digital photograph; and
   rendering the filtered version of the digital photograph as a sketch effect for the digital photograph.

11. The computer program product of claim 10, further comprising executable program code for analyzing the filtered version of the digital photograph for line data.

12. The computer program product of claim 10, further comprising executable program code for generating a matrix using line data for the filtered version of the digital photograph.

13. The computer program product of claim 10, further comprising executable program code for determining a count for each continuous line identified in a matrix for the filtered version of the digital photograph.

* * * * *

UNITED STATES PATENT AND TRADEMARK OFFICE
CERTIFICATE OF CORRECTION

PATENT NO.         : 7,724,287 B2                                  Page 1 of 1
APPLICATION NO. : 11/496219
DATED              : May 25, 2010
INVENTOR(S)        : Robert P. Cazier et al.

It is certified that error appears in the above-identified patent and that said Letters Patent is hereby corrected as shown below:

In the Claims:

In column 6, line 50, in Claim 5, delete "appealing" and insert -- appearing --, therefor.

Signed and Sealed this

Twenty-first Day of September, 2010

David J. Kappos
*Director of the United States Patent and Trademark Office*